United States Patent
Ohta et al.

(10) Patent No.: US 11,299,061 B2
(45) Date of Patent: Apr. 12, 2022

(54) CHARGING AND DISCHARGING MANAGEMENT SYSTEM

(71) Applicant: TOYOTA JIDOSHA KABUSHIKI KAISHA, Toyota (JP)

(72) Inventors: Ikuo Ohta, Toyota (JP); Hideshi Mizutani, Toyota (JP); Atsushi Sajiki, Okazaki (JP); Takao Inata, Tokyo-to (JP); Yohei Tanigawa, Toyota (JP); Atsushi Nakajima, Kariya (JP); Atsuo Komatsubara, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 16/923,309

(22) Filed: Jul. 8, 2020

(65) Prior Publication Data
US 2021/0023959 A1  Jan. 28, 2021

(30) Foreign Application Priority Data
Jul. 26, 2019 (JP) .............................. JP2019-137818

(51) Int. Cl.
*H02J 7/00*  (2006.01)
*H02J 7/14*  (2006.01)
*B60L 55/00* (2019.01)
*B60L 53/66* (2019.01)
*B60L 53/60* (2019.01)

(52) U.S. Cl.
CPC ............... *B60L 55/00* (2019.02); *B60L 53/60* (2019.02); *B60L 53/665* (2019.02); *H02J 7/0071* (2020.01)

(58) Field of Classification Search
USPC ......................................................... 320/109
See application file for complete search history.

(56) References Cited

U.S. PATENT DOCUMENTS

| 8,989,954 B1* | 3/2015 | Addepalli | H04W 8/06 701/32.3 |
| 9,371,007 B1* | 6/2016 | Penilla | G07F 15/005 |
| 2013/0127417 A1* | 5/2013 | Karner | B60L 53/63 320/109 |
| 2014/0152256 A1* | 6/2014 | Lowenthal | H02J 13/0075 320/109 |

(Continued)

FOREIGN PATENT DOCUMENTS

JP          2007006574 A          1/2007

*Primary Examiner* — Alexis B Pacheco
(74) *Attorney, Agent, or Firm* — Dickinson Wright, PLLC

(57) ABSTRACT

A charging and discharging management system according to the present disclosure is a system for, in regard to a vehicle on which a battery capable of being charged and discharged is mounted, charging and discharging the battery, the charging and discharging management system including: an information collection unit configured to collect boarding information indicating an aircraft which a driver of the vehicle plans to board, the vehicle being parked in a parking lot in an airport; a parking period acquisition unit configured to acquire a parking period of the vehicle based on the boarding information pieces collected by the information collection unit; and a determination unit configured to determine a timing at which the battery mounted on the vehicle is charged and discharged based on the parking period acquired by the parking period acquisition unit.

4 Claims, 6 Drawing Sheets

(56) References Cited

U.S. PATENT DOCUMENTS

| | | | |
|---|---|---|---|
| 2015/0091504 A1* | 4/2015 | Hyde | B60L 53/51 |
| | | | 320/108 |
| 2019/0016312 A1* | 1/2019 | Carlson | B60L 53/66 |
| 2019/0377365 A1* | 12/2019 | Terahata | G06Q 20/0855 |
| 2021/0083497 A1* | 3/2021 | Fujita | H02J 7/0048 |
| 2021/0188115 A1* | 6/2021 | Kazuno | B60L 53/305 |
| 2021/0213938 A1* | 7/2021 | Watanabe | G08G 1/14 |
| 2021/0284039 A1* | 9/2021 | Ando | B60L 58/12 |

\* cited by examiner

| VEHICLE NUMBER | BOARDING INFORMATION | | PARKING PERIOD | |
|---|---|---|---|---|
| | OUTWARD | RETURN | START | EXPIRATION |
| 1111 | FLIGHT NUMBER : A101<br>DEPARTURE : 2019/1/1 9:00 | FLIGHT NUMBER : A201<br>ARRIVAL : 2019/1/3 8:00 | 2019/1/1 7:00 | 2019/1/3 10:00 |
| 2222 | FLIGHT NUMBER : B111<br>DEPARTURE : 2019/1/1 9:30 | FLIGHT NUMBER : B211<br>ARRIVAL : 2019/1/4 19:00 | 2019/1/1 7:30 | 2019/1/4 21:00 |
| .. | .. | .. | .. | .. |

Fig. 3

CHARGING AND DISCHARGING MANAGEMENT SYSTEM

CROSS REFERENCE TO RELATED APPLICATIONS

This application is based upon and claims the benefit of priority from Japanese patent application No. 2019-137818, filed on Jul. 26, 2019, the disclosure of which is incorporated herein in its entirety by reference.

BACKGROUND

The present disclosure relates to a charging and discharging management system.

In the event of a power failure at a facility such as an airport due to a disaster or like, electric power to be supplied to equipment in the facility may be insufficient. Further, if a disaster occurs at an airport or the like, the number of evacuees increases, resulting in a significant increase in demand for electric power of the facility, which could lead to an electric power shortage.

Therefore, in recent years, facilities have been discussing measures to enable electric power to be supplied to the equipment in the facilities even in the event of an electric power shortage.

For example, Japanese Unexamined Patent Application Publication No. 2007-006574 discloses a technique for supplying electric power from a vehicle parked in a parking lot of a facility based on a load (demand) pattern of the facility.

SUMMARY

In some airports, the parking period of a vehicle parked in a parking lot is fixed. For example, when the driver of a vehicle parked in a parking lot boards an aircraft, the vehicle is considered to be parked in the parking lot until the driver arrives at the current airport on a return aircraft. Therefore, there is a possibility that a vehicle parked in a parking lot in an airport can be charged and discharged more efficiently.

The present disclosure has been made in view of the aforementioned circumstances and an object thereof is to provide a charging and discharging management system capable of more efficiently charging and discharging a vehicle parked in a parking lot in an airport.

A first exemplary aspect is a charging and discharging management system for, in regard to a vehicle on which a battery capable of being charged and discharged is mounted, charging and discharging the battery, the charging and discharging management system including:

an information collection unit configured to collect boarding information indicating an aircraft which a driver of the vehicle plans to board, the vehicle being parked in a parking lot in an airport;

a parking period acquisition unit configured to acquire a parking period of the vehicle based on the boarding information pieces collected by the information collection unit; and a determination unit configured to determine a timing at which the battery mounted on the vehicle is charged and discharged based on the parking period acquired by the parking period acquisition unit.

According to the above-described disclosure, it is possible to provide a charging and discharging management system capable of more efficiently charging and discharging a vehicle parked in a parking lot in an airport.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 is a diagram showing an example of information stored by a determination unit of the charging and discharging management system according to the embodiment;

DESCRIPTION OF EMBODIMENTS

Hereinafter, although the present disclosure will be described with reference to an embodiment of the present disclosure, the present disclosure according to claims is not limited to the following embodiment. Moreover, all the components described in the following embodiment are not necessarily essential as means for solving problems. For the clarification of the description, the following description and drawings are omitted or simplified as appropriate. Throughout the following drawings, the same components are denoted by the same reference signs and repeated descriptions will be omitted as appropriate.

First, a premise configuration as a premise of a charging and discharging management system 1 according to this embodiment is described with reference to FIG. 1.

Figure 1:
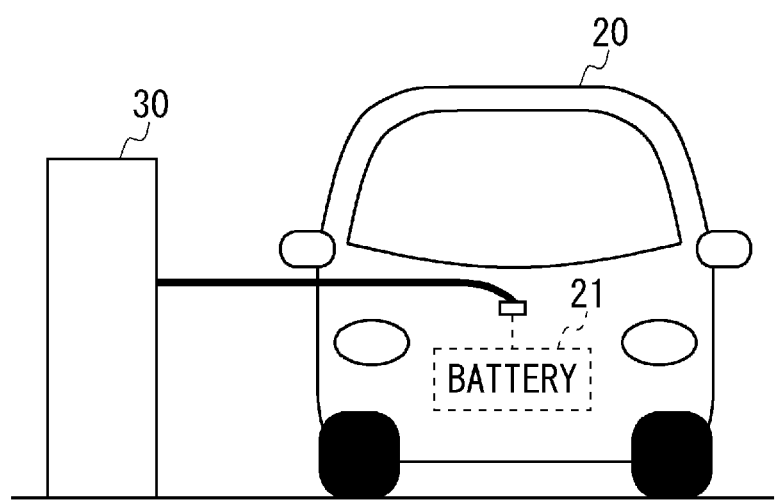
FIG. 1 is a diagram for explaining a premise configuration of a charging and discharging management system according to an embodiment.

As shown in FIG. 1, a charging and discharging equipment 30 that charges and discharges a battery 21 of a parked vehicle 20 is installed in a parking lot in an airport. In the event of an electric power shortage at an airport (e.g., in the event of a power failure or a significant increase in demand for electric power of the airport due to a disaster), the charging and discharging equipment 30 discharges the battery 21 of the vehicle 20, and the battery 21 of the vehicle 20 supplies electric power to the equipment in the airport.

The charging and discharging management system 1 according to this embodiment is a system for more efficiently charging and discharging the battery 21 in regard to the vehicle 20 parked in the parking lot in the airport under the above-described premise configuration.

Note that the vehicle 20 may be any vehicle on which the battery 21 capable of being charged and discharged is mounted. For example, the vehicle 20 may be an electric vehicle (EV), a plug-in hybrid vehicle (PHV), a plug-in fuel cell vehicle (plug-in FCV), or the like.

Next, a configuration example of the charging and discharging management system 1 according to this embodiment is described with reference to FIG. 2.

Figure 2:
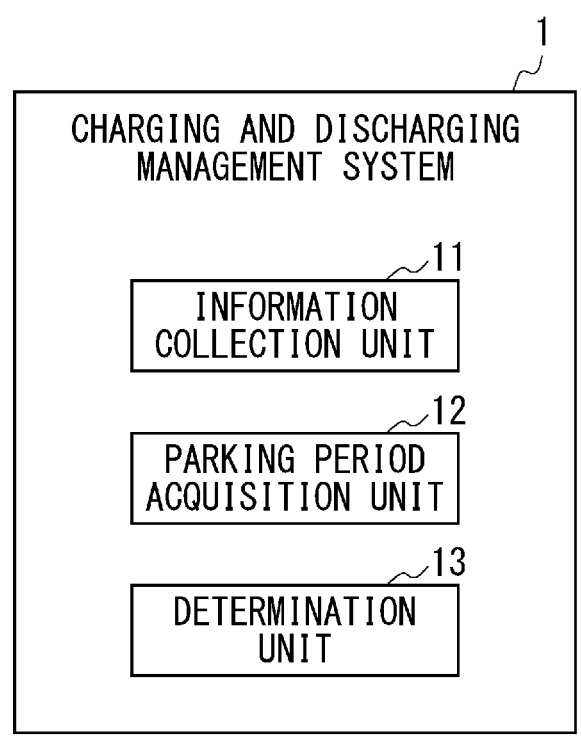
FIG. 2 is a block diagram showing a configuration example of the charging and discharging management system according to the embodiment.

As shown in FIG. 2, the charging and discharging management system 1 according to this embodiment includes an information collection unit 11, a parking period acquisition unit 12, and a determination unit 13.

The information collection unit 11 collects boarding information indicating an aircraft which the driver of the vehicle 20 parked in a parking lot in an airport plans to board. Note that it is suitable that the boarding information include both the flight number and the arrival and departure date of the aircraft, but it may include only either one of them. Further, although it is suitable that the boarding information be information indicating both an outward and a return aircraft, the boarding information may also be information indicating only a return aircraft since it is important for this embodiment to confirm the time when a parking period of the vehicle expires. Further, for example, the information collection unit 11 may collect boarding information by installing a reader at an entrance gate or a parking space of a parking lot and having a driver hold the boarding pass over the reader. Alternatively, the information collection unit 11 may collect boarding information by installing an input device at an entrance gate or a parking space of a parking lot and having a driver manually input the boarding information. Further, it is suitable that the boarding information be collected in association with the number (the registration number) of the vehicle 20. For example, the information collection unit 11 may collect the number of the vehicle 20 by installing a photographing apparatus at an entrance gate or a parking space of a parking lot and recognizing the image of the number plate of the vehicle 20 taken by the photographing apparatus. Alternatively, the information collection unit 11 may collect the number of the vehicle 20 by installing an input device at an entrance gate or a parking space of a parking lot and having a driver manually input the number of the vehicle 20.

The parking period acquisition unit 12 acquires a parking period of the vehicle 20 based on the boarding information pieces collected by the information collection unit 11. For example, the time when the parking period starts may be the time when the boarding information pieces are collected by the information collection unit 11, and the time when the parking period expires may be a predetermined time after the time when the return aircraft arrives at the current airport. Note that if the boarding information indicates only the flight number of the return aircraft, the time when the return aircraft arrives at the current airport is acquired by checking the flight number against the database or the like, and then the time when the parking period expires is determined by using the acquired time.

The determination unit 13 determines a timing at which the battery 21 mounted on the vehicle 20 is charged and discharged based on the parking period acquired by the parking period acquisition unit 12. At this time, for example, as shown in FIG. 3, it is suitable that the determination unit 13 store the boarding information of the driver of the vehicle 20 and the parking period information of the vehicle 20 in association with the number of the vehicle 20 to thereby determine a timing at which the battery 21 is charged and discharged based on these information pieces. When the determination unit 13 determines the timing at which the battery 21 mounted on the vehicle 20 is charged and discharged, the determination unit 13 notifies the charging and discharging equipment 30 of the determined timing at which the battery 21 is charged and discharged in association with the number of the vehicle 20. The charging and discharging equipment 30 identifies the vehicle 20 by the number of the vehicle 20 and charges and discharges the battery 21 mounted on the identified vehicle 20 at the timing it has been notified about in association with the number of the vehicle 20. At this time, for example, the photographing apparatus is installed in a parking space in which the charging and discharging equipment 30 is installed, the photographing apparatus photographs the number plate of the vehicle 20 parked in the parking space, and the charging and discharging equipment 30 recognizes the image of the number plate of the vehicle 20 taken by the photographing apparatus, so that the number of the vehicle 20 may be determined. Note that a specific method for the determination unit 13 determining a timing at which the battery 21 is charged and discharged will be described later.

This embodiment is directed to the vehicle 20 on which the battery 21 capable of being charged and discharged is mounted, and in order to properly charge and discharge the vehicle 20, it is necessary to guide the vehicle 20 to the parking space in which the charging and discharging equipment 30 is installed.

Therefore, for example, in the parking lot in the airport, an entrance gate dedicated to the vehicle 20 on which the battery 21 capable of being charged and discharged is mounted may be installed, and a parking space dedicated to the vehicle 20 which can be reached only from the dedicated entrance gate and in which the charging and discharging equipment 30 is installed may be installed. By doing so, the vehicle 20 can be guided to the parking space in which the charging and discharging equipment 30 is installed.

Alternatively, in the parking lot in the airport, the vehicle 20 may be guided by installing a common entrance gate for the vehicle 20 on which the battery 21 capable of being charged and discharged is mounted and vehicles other than the vehicle 20 (i.e., vehicles on which no batteries 21 capable of being charged and discharged are mounted), identifying the vehicle at the entrance gate whether or not it is the vehicle 20, and outputting, to the identified vehicle 20, a voice message or a display message instructing a driver to go to the parking space in which the charging and discharging equipment 30 is installed. At this time, for example, the type of the vehicle may be determined by installing a photographing apparatus at the common entrance gate and recognizing the image of the vehicle taken by the photographing apparatus, and it may be identified whether the vehicle is the vehicle 20 from the determined type of the vehicle.

Further, regarding the vehicle 20 on which the battery 21 capable of being charged and discharged is mounted, it is necessary to not only guide it so that it parks in the parking space in which the charging and discharging equipment 30 is installed, but also to cause the battery 21 to be connected to the charging and discharging equipment 30 during the parking of the vehicle 20. Therefore, for example, the charging and discharging equipment 30 may prompt the vehicle 20 parked in the parking space in which the charging and discharging equipment 30 is installed to connect the battery 21 to the charging and discharging equipment 30 by outputting, to the vehicle 20, a voice message or a display message instructing that the battery 21 be connected to the charging and discharging equipment 30.

Next, a flow of processing performed by the charging and discharging management system 1 according to this embodiment is described with reference to FIG. 4.

Figure 4:
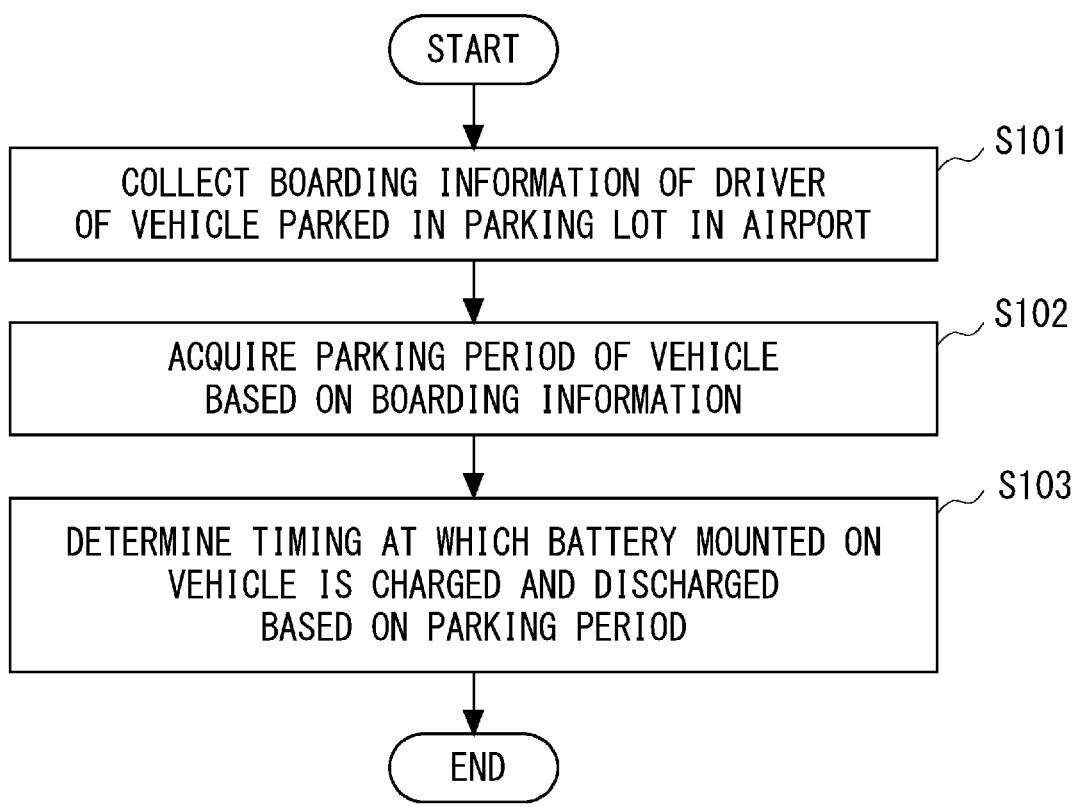
FIG. 4 is a flowchart showing a flow of processing performed by the charging and discharging management system according to the embodiment.

As shown in FIG. 4, first, the information collection unit 11 collects boarding information showing an aircraft which the driver of the vehicle 20 parked in a parking lot in an airport plans to board (Step S101).

Next, the parking period acquisition unit 12 acquires a parking period of the vehicle 20 based on the boarding information pieces collected by the information collection unit 11 (Step S102).

After that, the determination unit 13 determines a timing at which the battery 21 mounted on the vehicle 20 is charged and discharged based on the parking period acquired by the parking period acquisition unit 12 (Step S103).

Next, a flow of specific processing performed in Step S103 of FIG. 4 is described.

First, a flow of processing for determining a timing at which the battery 21 is discharged in Step S103 of FIG. 4 is described with reference to FIG. 5.

Figure 5:
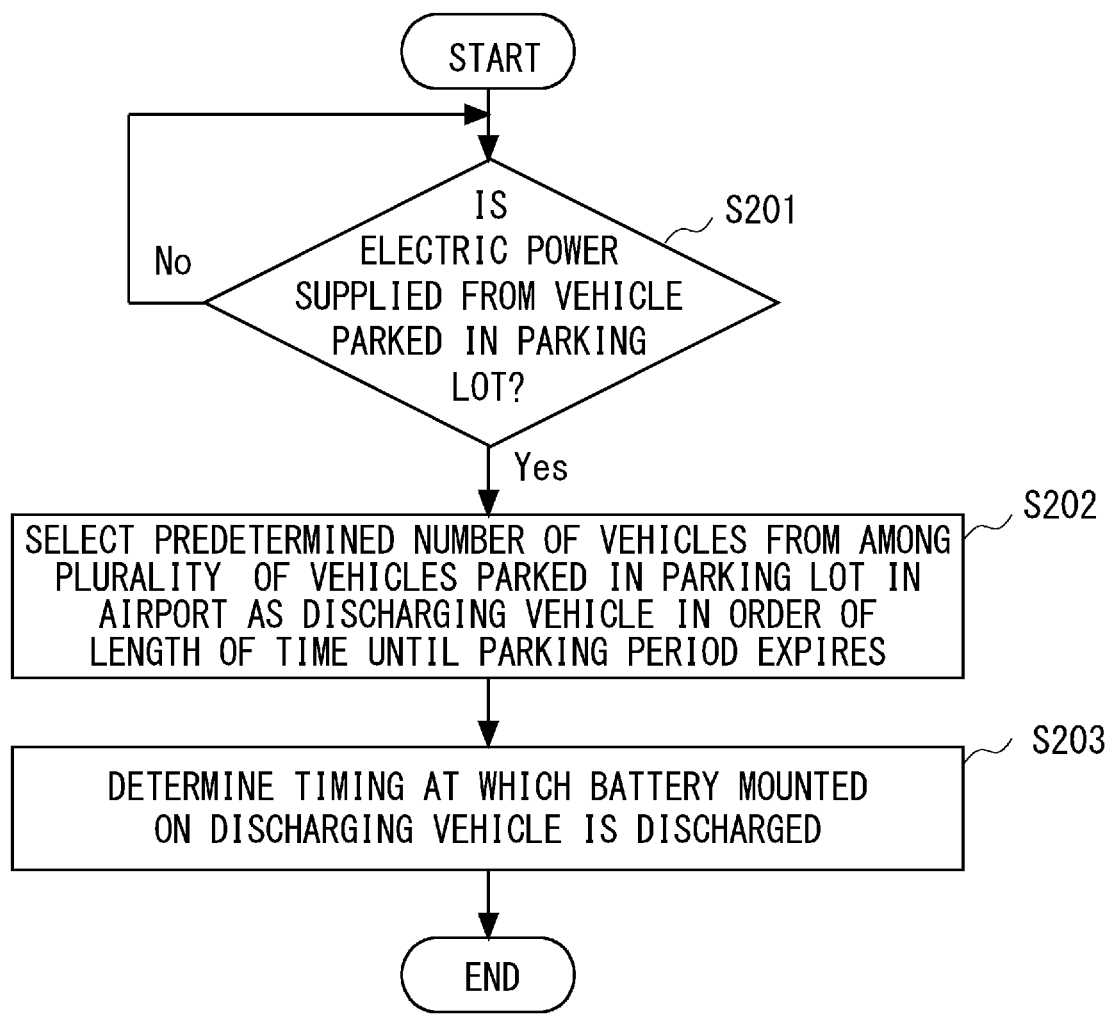
FIG. 5 is a flowchart showing a flow of specific processing performed in Step S103 of FIG. 4.

As shown in FIG. 5, first, the determination unit 13 determines whether to supply electric power to the equipment in the airport from the vehicle 20 parked in the parking lot in the airport (Step S201). For example, in the event of an electric power shortage at an airport (e.g., in the event of a power failure or a significant increase in demand for electric power of the airport due to a disaster), the determination unit 13 determines to supply electric power from the vehicle 20.

In this example, it is assumed that a plurality of vehicles 20 are parked in the parking lot in the airport. If the determination unit 13 determines to supply electric power from the vehicle 20 in Step S201 (Yes in Step S201), the determination unit 13 next selects, in the order of the length of time until the parking period expires, a predetermined number of vehicles 20 from among the plurality of vehicles 20 parked in the parking lot in the airport as a vehicle (hereinafter referred to as a discharging vehicle as appropriate) that discharges the battery 21 and supplies electric power to the equipment in the airport (Step S202). Note that it is sufficient that the predetermined number of vehicles 20 be one or more, and the predetermined number can be determined, for example, in accordance with the amount of the insufficiency of the electric power at the airport.

Then, the determination unit 13 determines a timing at which the battery 21 mounted on the vehicle 20 selected as the discharging vehicle in Step S202 is discharged (Step S203). For example, the determination unit 13 may determine a time after a predetermined time elapses from when it selects the vehicle 20 as the discharging vehicle in Step S202 to be the timing at which the battery 21 mounted on the vehicle 20 is discharged.

In FIG. 5, the operation performed on the assumption that the plurality of vehicles 20 are parked in the parking lot in the airport has been described, but in some cases, only one vehicle 20 is parked. In such a case, if the determination unit 13 determines to supply electric power from the vehicle 20 in Step S201, the parked one vehicle 20 is selected as the discharging vehicle regardless of the parking period.

Next, a flow of processing for determining a timing at which the battery 21 is charged in Step S103 of FIG. 4 is described with reference to FIG. 6.

Figure 6:
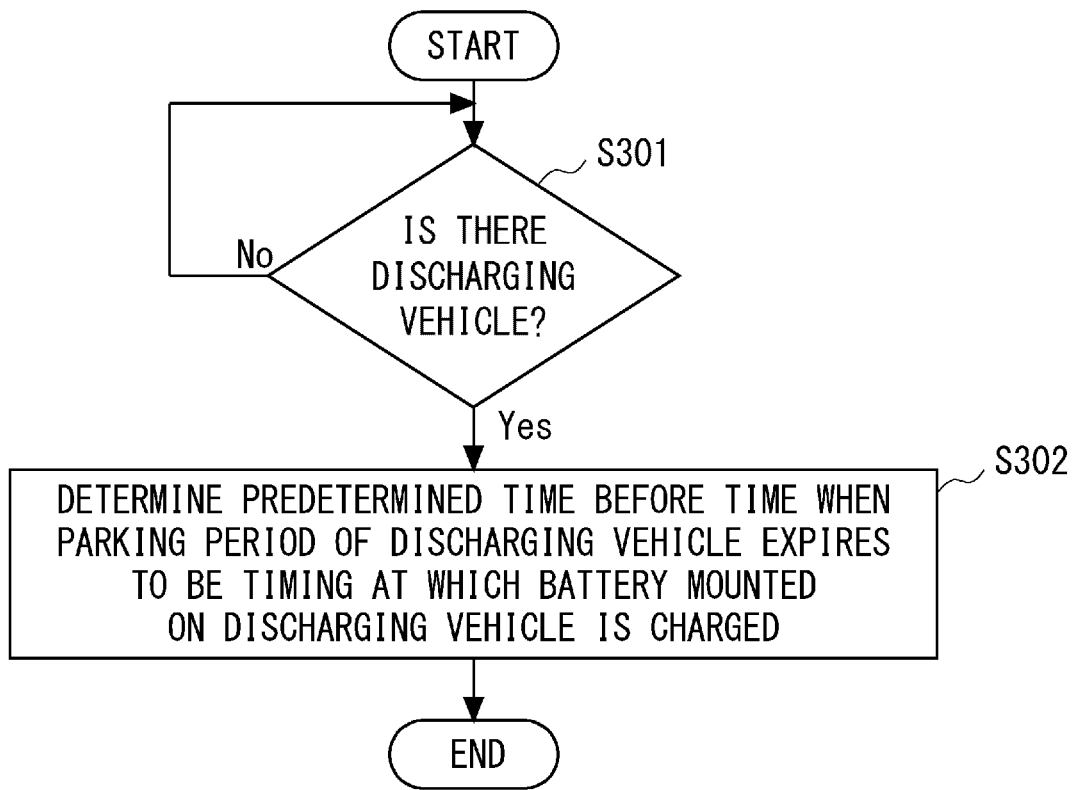
FIG. 6 is a flowchart showing a flow of specific processing performed in Step S103 of FIG. 4.

As shown in FIG. 6, first, the determination unit 13 determines whether or not the vehicle 20, which has been selected as the discharging vehicle, is among the vehicles 20 parked in the parking lot in the airport (Step S301).

If the vehicle 20 which has been selected as the discharging vehicle is among the vehicles 20 parked in the parking lot in the airport (Yes in Step S301), the determination unit 13 determines a predetermined time before the time when the parking period of the vehicle 20 expires to be the timing at which the battery 21 mounted on the vehicle 20 is charged (Step S302).

At this time, the determination unit 13 may store the remaining amount of the charge of the battery 21, which is mounted on the vehicle 20 selected as the discharging vehicle, before discharging and thereby determine the amount of charge to be charged to the battery 21 so that the amount of the charge of the battery 21 returns to the remaining amount of the charge thereof before discharging. In this case, the determination unit 13 may notify the charging and discharging equipment 30 of the determined amount of charge in association with the determined timing at which the battery 21 is charged and the number of the vehicle 20. The charging and discharging equipment 30 identifies the vehicle 20 by the number of the vehicle 20 and charges the battery 21 mounted on the identified vehicle 20 at the timing and with the amount it has been notified about in association with the number of the vehicle 20.

Next, an effect of the charging and discharging management system 1 according to this embodiment is described.

In the charging and discharging management system 1 according to this embodiment, boarding information indicating an aircraft which the driver of the vehicle 20 parked in a parking lot in an airport plans to board is collected, the parking period of the vehicle 20 is acquired based on the collected boarding information pieces, and a timing at which the battery 21 mounted on the vehicle 20 is charged and discharged is determined based on the acquired parking period.

By this configuration, it is possible to determine a timing at which the vehicle 20 is charged and discharged in accordance with the parking period of the vehicle 20 parked in a parking lot in an airport, and thus it is possible to more efficiently charge and discharge the vehicle 20 parked in the parking lot in the airport.

Note that the present disclosure is not limited to the above-described embodiment and can be modified as appropriate without departing from the spirit of the present disclosure.

For example, in the aforementioned embodiment, electric power is supplied from the vehicle 20 parked in a parking lot in an airport to the equipment in the airport in the event of an electric power shortage at the airport, but this configuration is merely an example. In such a case, as it is an emergency, if a work vehicle such as a towing car working in the airport is a vehicle on which a battery capable of being charged and discharged is mounted, electric power may be supplied from the work vehicle to the equipment in the airport.

Further, in the above-described embodiments, the charging and discharging management system according to the present disclosure has been described as a hardware configuration, but the present disclose is not limited thereto. In the present disclosure, any processing of the charging and discharging management system can be achieved by a processor, such as a CPU (Central Processing Unit), loading and executing a computer program stored in a memory.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A charging and discharging management system for, in regard to a vehicle on which a battery capable of being charged and discharged is mounted, charging and discharging the battery, the charging and discharging management system comprising:
    an information collection unit configured to collect boarding information indicating an aircraft which a driver of the vehicle plans to board, the vehicle being parked in a parking lot in an airport;
    a parking period acquisition unit configured to acquire a parking period of the vehicle based on the boarding information pieces collected by the information collection unit; and
    a determination unit configured to determine a timing at which the battery mounted on the vehicle is charged and discharged based on the parking period acquired by the parking period acquisition unit.

2. The charging and discharging management system according to claim 1, wherein when electric power is supplied from the vehicle parked in the parking lot in the airport to equipment in the airport while a plurality of vehicles are parked in the parking lot in the airport, the determination unit selects, in an order of a length of time until the parking period expires, a predetermined number of vehicles from among the plurality of vehicles parked in the parking lot in the airport as a discharging vehicle that discharges the battery and supplies electric power to the equipment in the airport, and determines a timing at which the battery mounted on the selected discharging vehicle is discharged.

3. The charging and discharging management system according to claim 2, wherein the determination unit determines a predetermined time before a time when the parking period of the discharging vehicle expires to be a timing at which the battery mounted on the discharging vehicle is charged.

4. The charging and discharging management system according to claim 3, wherein the determination unit stores a remaining amount of the charge of the battery mounted on the discharging vehicle before discharging, and thereby determines an amount of charge to be charged to the battery so that the amount of the charge of the battery returns to the remaining amount of the charge of the battery mounted on the discharging vehicle before discharging.

\* \* \* \* \*